Oct. 20, 1942.　　A. J. BOYNTON ET AL　　2,299,124
VALVE
Filed May 31, 1939　　5 Sheets-Sheet 2
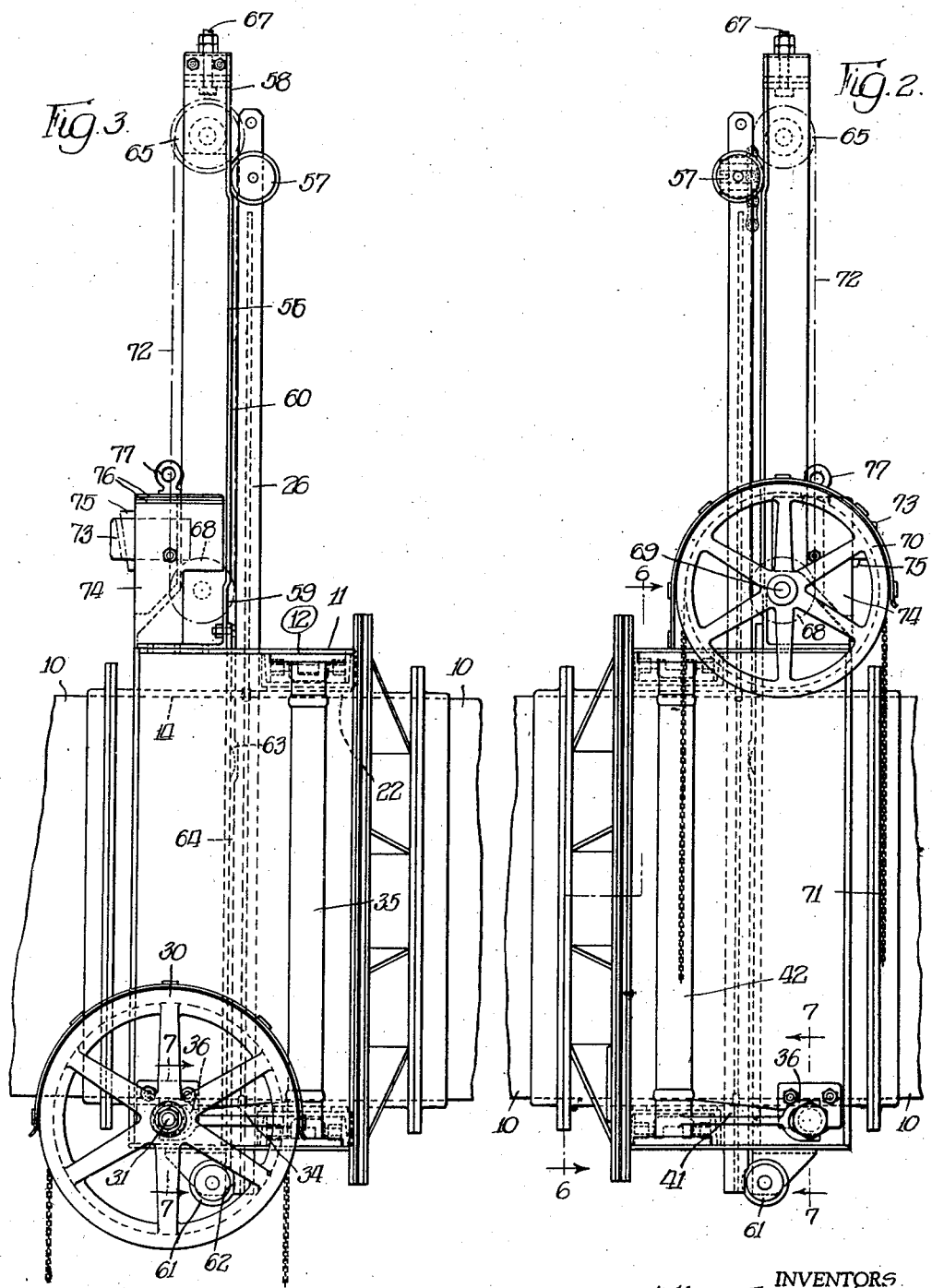
INVENTORS
Arthur J. Boynton,
Carl J. Westling,
BY
ATTORNEYS.

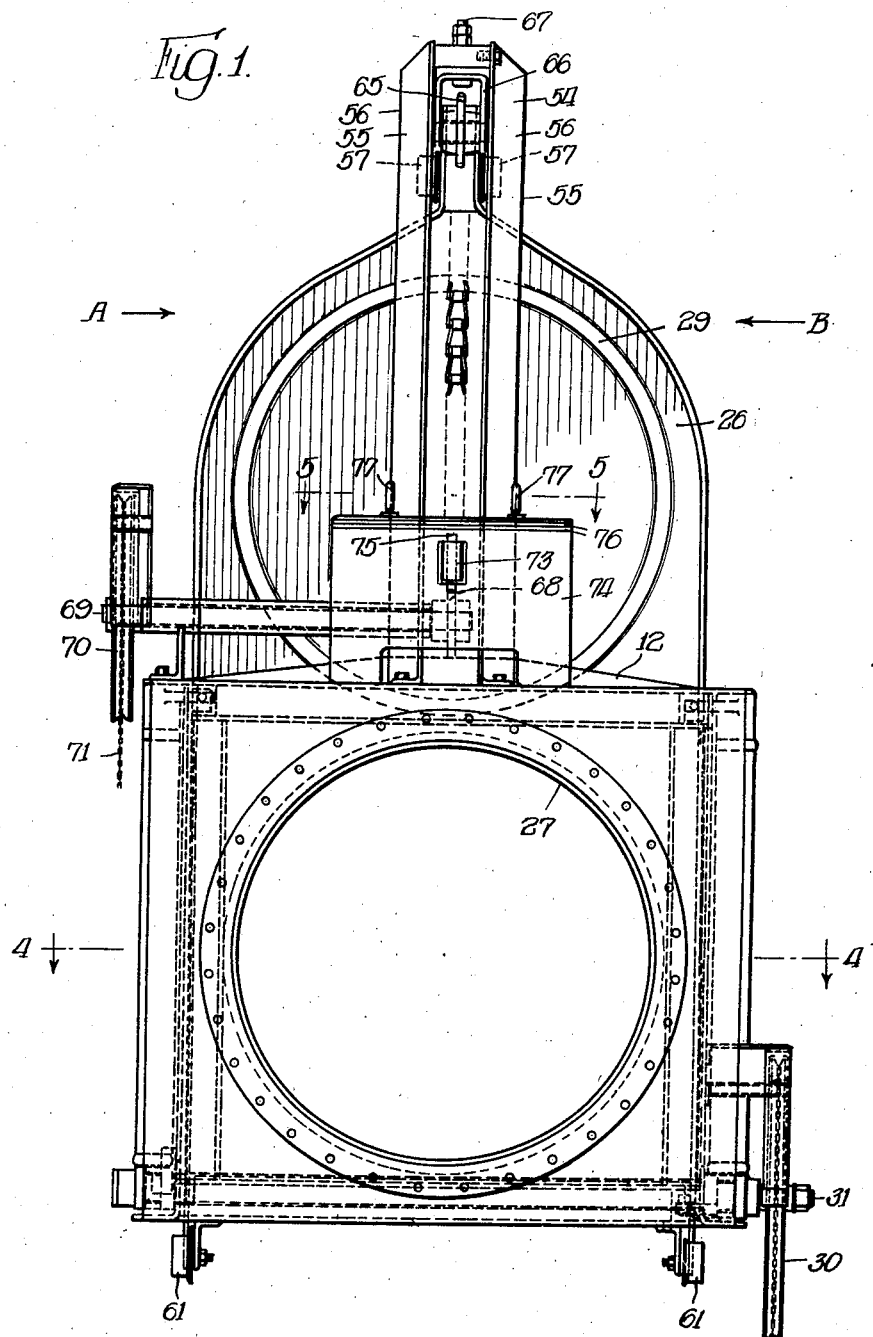

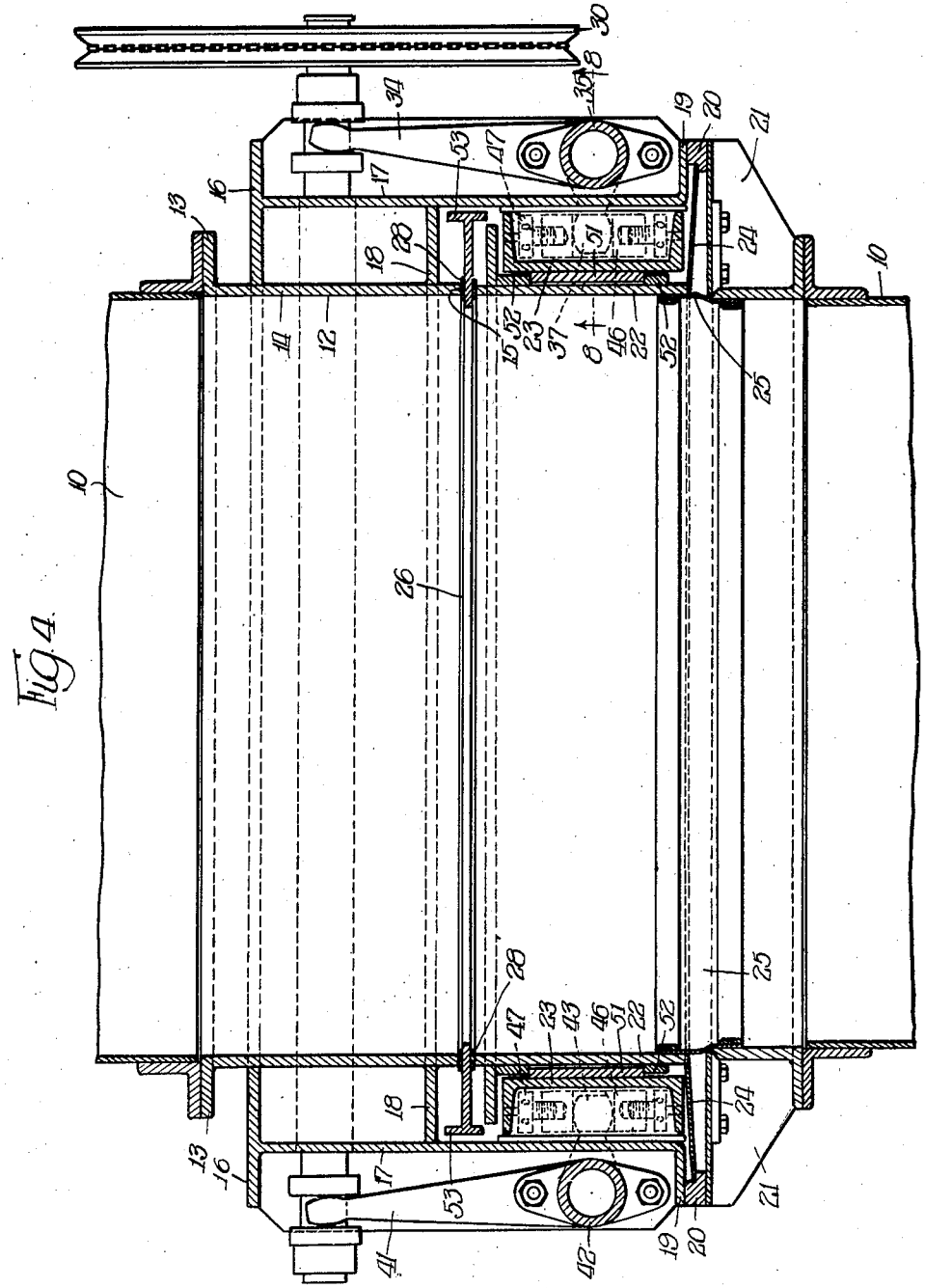

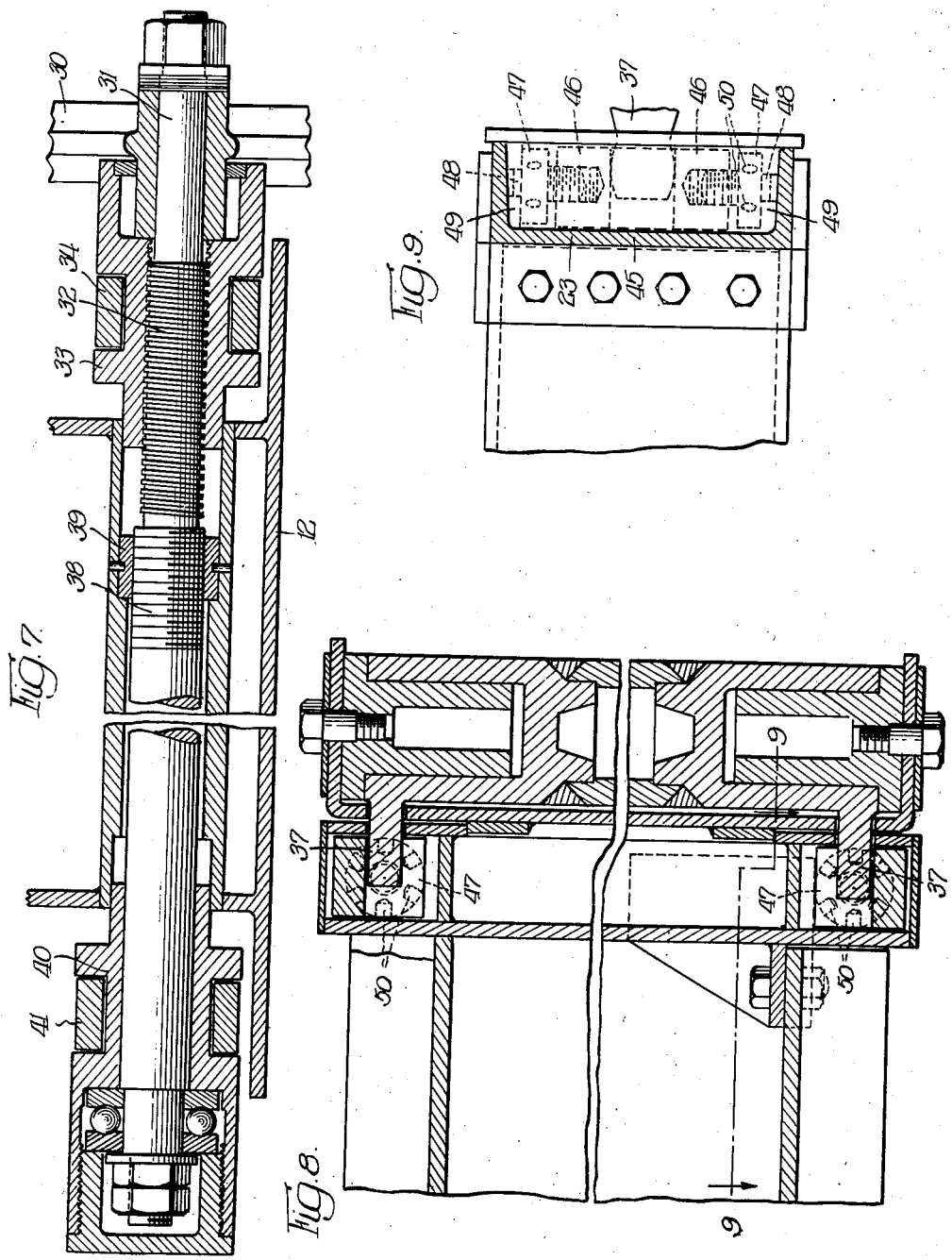

Patented Oct. 20, 1942

2,299,124

UNITED STATES PATENT OFFICE 2,299,124

VALVE

Arthur J. Boynton and Carl J. Westling, Chicago, Ill., assignors to H. A. Brassert & Company, Chicago, Ill., a corporation of Illinois Application May 31, 1939, Serial No. 276,540

13 Claims. (Cl. 251—167)

The present invention relates to improvements in valves.

More particularly the present invention relates to that type of valve which is used in blast furnace installations or similar installations where large conduits carrying gases must be controlled. In blast furnace operation, gases to be handled contain carbon monoxide and other noxious or dangerous gases, and it is essential that there be no serious leaks around the valve to permit escape of the gas past the valve when the valve is in closed position. The present invention is embodied in a sliding type of valve in which a sliding plate selectively completely shuts off the passageway through the valve or completely opens said passageway.

An object of the present invention is to provide a valve of the type above referred to which is relatively light in weight, relatively simple to manufacture, and quite effective in operation.

A further object is to provide a valve of the sliding plate type from which the sliding plate and the operating mechanism therefor may be readily assembled with or disassembled from the remainder of the valve assembly without removing the remainder of the valve assembly from its connections with the conduits.

A further object is to provide an improved valve of the sliding plate type having means for clamping the sliding plate in either of its two alternative positions, together with novel adjusting mechanism for insuring uniform clamping pressure throughout the periphery of the valve seat.

A further object is to provide an improved valve of the sliding plate type which in a relatively light structure will be sufficiently stiff to maintain proper alignment.

A further object is to provide an improved slide valve having reinforcing means for preventing accidental distortion in service.

A further object is to provide an improved valve of the sliding plate type having improved counterweighting means.

A further object is to provide an improved valve structure which without the use of expensive castings or the like has sufficient beam strength to prevent distortions in service.

A further object is to provide an improved valve of the slide plate type which is embodied in a self-contained unit and having clamping means for insuring against leakage, together with positive means for applying and withdrawing said clamping means.

A further object is to provide an improved valve which is equally capable of application to conduits disposed in vertical, horizontal or inclined position.

A further object is to provide an improved valve of the slide plate type provided with means for positively moving the slide plate away from engagement with its seat at the beginning of its sliding movement and returned to its seat at the end of such sliding movement.

A further object is to provide an improved valve of the slide plate type which is efficient, capable of ready examination, capable of lubrication, and substantially dirt-proof.

A further object is to provide an improved valve of the slide plate type which is capable of rapid manual operation without undue exertion by the operator.

A further object is to provide an improved valve of the slide plate type well adapted to meet the needs of commercial operation.

A further object is to provide improved operating mechanism for the slide plate of a valve of the type above referred to in which the counterweight, the operating chain, and the attachment members may be readily assembled with or disassembled from the slide plate and the valve body.

Further objects will appear as the description proceeds.

Referring to the drawings—

Figure 1 is a view in elevation of a valve embodying the principles of the present invention;

Figure 2 is a view in side elevation of the structure shown in Figure 1, said side elevation being taken in the direction of the arrow "A" in Figure 1;

Figure 3 is a view in side elevation of the structure shown in Figure 1, said side elevation being taken in the direction of the arrow "B" in Figure 1;

Figure 4 is a cross sectional view taken along the plane indicated by the arrows 4—4 of Figure 1;

Figure 7 is a sectional view on an enlarged scale, taken along the plane indicated by the arrows 7—7 of Figures 2 and 3;

Figure 8 is a sectional view on an enlarged scale taken along the plane indicated by the arrows 8—8 of Figure 4;

Figure 9 is a sectional view taken along the planes indicated by the arrows 9—9 of Figure 8.

Figure 6:
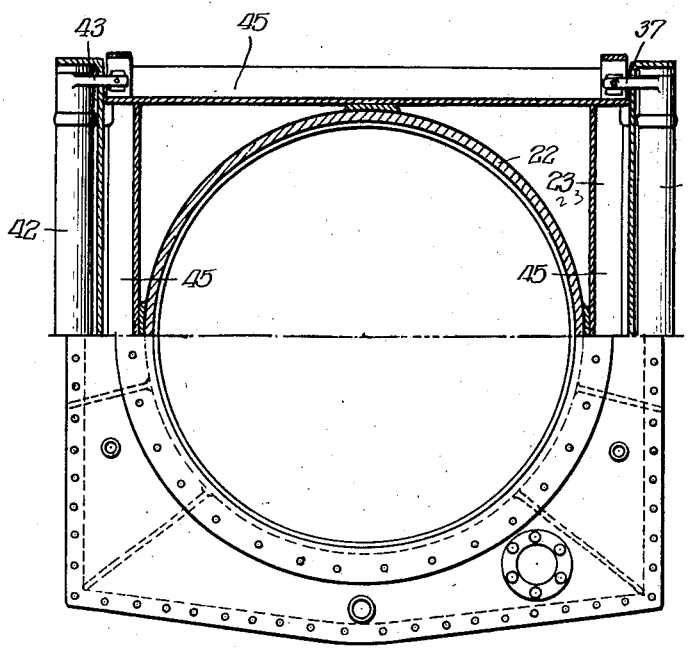
Figure 6 is a view, partly in section and partly in end elevation, of the structure shown in the preceding figures, said Figure 6 being taken along the planes indicated by the arrows 6—6 of Figure 2.

Referring first to Figures 2 and 4, the numerals 10—10 indicate two aligned conduits. Disposed between the adjacent extremities of said two conduits is the valve assembly, indicated as a whole by the numeral 11, which embodies the present invention.

Said valve assembly 11 includes a rigid unitary frame structure, a cross sectional view of which appears in Figure 4. Said unitary frame structure is indicated as a whole by the numeral 12, and is preferably made up of a plurality of structural steel plates of common commercial shapes joined together into a rigid construction.

Reading from top to bottom of Figure 4, the frame structure 12 includes the flange 13 adapted to cooperate with a corresponding flange on one of the conduits 10. Secured to the inner periphery of the flange 13 is the cylindrical member 14, which at its extremity spaced from the flange 13 is provided with the annular seat 15. Encircling the cylindrical member 14 and secured thereto is the flange plate 16. Said plate 16 is disposed at right angles to the axis of the cylinder 14. Attached to the cylinder 14 and to the plate 16 are members 17 and 18 forming a rigid box-like construction for supporting and housing certain lever operating mechanism, to be described more in detail hereinafter. Said member 17 at its lower extremity is flanged as indicated by the numeral 19, and to the outer side of said flange 19 is secured the spacer or filler 20, to which is secured the flange structure, indicated as a whole by the numeral 21, adapted to cooperate with a corresponding flange on the conduit 10 shown at the lower extremity of Figure 4. Coaxially disposed with respect to the cylindrical member 14 is the cylindrical clamping member 22 having an interior diameter equal to the interior of the cylindrical member 14. Said cylindrical clamping member 22 is adapted to be moved axially and is supported by a clamping frame 23, to be described more in detail hereinafter. Said clamping cylinder 22 is connected to the filler or spacer 20 by means of the annular flex plate 24, said annular flex plate having a gas-tight connection with the clamping cylinder 22 and the spacer or filler 20. The spacer or filler 20 also has a gas-tight connection with the flange construction 21. The flange construction 21 with its attached spacer or filler 20 is bolted or otherwise detachably secured to the flange 19. By reason of the construction immediately above described, the assembly including the flange construction 21, spacer or filler 20, flex plate 24 and clamping cylinder 22 with the clamping frame 23, may be assembled into or disassembled from the frame structure 12.

Connecting the interior of the flange structure 21 with the interior of the clamping cylinder 22 is the flexible dirt seal 25, which prevents the ingress of dirt within the space between the flex plate 24 and the upper surface of the flange construction 21 as the parts are viewed in Figure 4.

By reason of the construction of the frame structure 12 as above described, sufficient beam strength is provided so that if flexing or torsional strains are had they will occur within the conduits 10—10 instead of within the valve structure, thereby preventing binding and imperfect sealing. Expressed in other language, the construction of the frame structure 12 as above described and the operating mechanism supported thereby has the advantage that any stresses communicated to the valve structure through either of the conduits 10—10 will not be communicated to the clamping cylinder 22 and therefore will not interfere with the proper sealing functions of said clamping cylinder 22.

Figure 10:
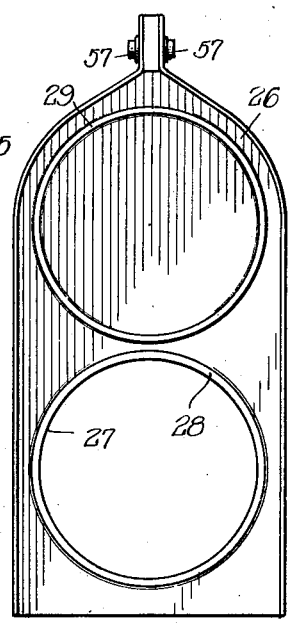
Figure 10 is a view of a slide plate valve member forming part of the preferred embodiment of the present invention.
Figure 5:
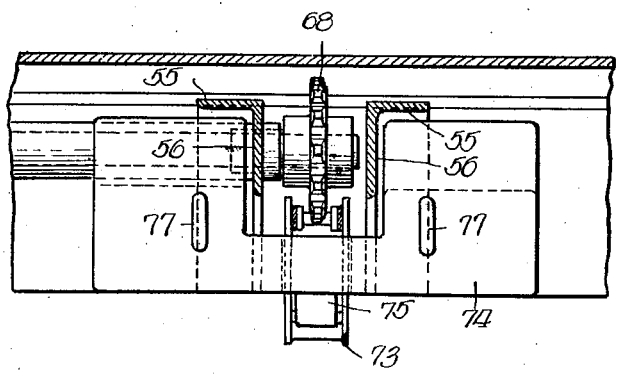
Figure 5 is a sectional view taken along the plane indicated by the arrows 5—5 of Figure 1.

Disposed between the cylinder member 14 of the frame structure 12 and the clamping cylinder 22 is a slide plate valve member 26 adapted to have a movement of reciprocation along a straight line. As the parts are viewed in Figures 1, 2 and 3, the movement of the slide plate valve member 26 is vertical. As the parts are viewed in Figure 4, the movement of the member 26 is at right angles to the plane of the paper. Said slide plate valve member 26 has an oblong contour, except that at its upper corners as the parts are viewed in Figure 1 it is rounded off. In its lower portion the member 26 is provided with an opening 27 of a diameter substantially equal to the diameter of the conduits 10—10. The upper portion of the slide plate valve member 26 is imperforate. As indicated in Figure 10, the opening 27 in the slide plate valve member 26 is bounded by the valve seat 28. This seat is located upon both sides of the member 26. The imperforate upper portion of the member 26 is provided on each side with a seat 29 similar to the seat 28 and of equal dimensions therewith.

It will be clear that to open the valve the slide plate valve member 26 will be hoisted to its uppermost position whereby the opening 27 therein will be in alignment with the cylinder 14 and the clamping cylinder 22 (Fig. 4). To permit movement of the member 26, the clamping cylinder 22 will, of course, be retracted, and when the member 26 is in either its opening position with the opening 27 in alignment with cylinders 14 and 22 or in its closing position with the valve seats 29 in alignment with the cylinder members 14 and 22, the clamping cylinder 22 will be moved into clamping position. In other words, except when the slide plate valve member 26 is being moved from one of its positions to the other, the clamping cylinder 22 will be in clamping relationship with either the valve seats 28—28 on the two sides of the member 26 or with the valve seats 29—29 on the two sides of the member 26. The means for positively moving the clamping cylinder 22 from its clamping position will now be described.

Referring to Figures 1, 2, 3 and 7 particularly, a sheave 30 is provided which is fixed to a shaft 31, which is mounted in suitable bearings in the frame structure 12. As indicated in Figure 7, said shaft 31 is provided with the screw-threaded portion 32. Threaded upon said screw-threaded portion 32 is the nut 33, which is held against rotation by a yoke lever 34. As indicated in Figures 2, 3 and 4, said yoke lever 34 is swung for movement about the axis of the rocking tube 35. Said lever 34 at its swinging end is provided with the yoke 36 adapted to engage a non-round portion of the periphery of the nut 33. It will be clear that as the sheave 30 is rotated in one direction or the other, an axial movement will be communicated to the nut 33, which will communicate a rocking movement to the yoke lever 34. This rocking movement will be communicated to the tube 35. Said tube 35 extends throughout substantially the height of the frame structure 12 and, adjacent to its two extremities, is provided with the short levers 37 (Figs. 4, 6, 8 and 9). Said shaft 31 is provided with another screw-threaded portion 38 screw-threaded into a nut 39 fast to the frame structure 12. Said screw-threaded portion 38 will preferably have a pitch equal to one-half the pitch of the threaded portion 32 of the shaft 31, for reasons which will be apparent and which will be referred to more in detail presently.

By reason of the engagement of the threaded portion 38 with the nut 39, rotation of the shaft 31 will produce longitudinal movement of said shaft 31. Adjacent to the end of the shaft 31 distant from the sheave 30 is a collar 40 adapted to receive intermediate of its ends the swinging extremity of a yoke lever 41, which may be similar to the yoke lever 34 above described. Said yoke lever 41 is swingingly disposed about the axis of the tube 42, which tube extends throughout substantially the height of the frame structure 12. Said tube 42 adjacent to its two ends is provided with the short levers 43—43 corresponding to the short levers 37—37 above described. Each of said short levers 37—37 and 43—43 is adapted to exert pressure through adjusting means, to be described presently, at the four corners of the clamping frame, indicated as a whole by the numeral 23. Said clamping frame 23 is approximately rectangular in contour and is made up of four side members, three of which are illustrated in Figure 6 and are indicated by the numerals 45—45. Said members 45—45 have their inner surfaces substantially tangent to the clamping cylinder 22, as indicated in Figure 6. As indicated above, the short levers 37—37 and 43—43 communicate motion through certain adjusting mechanism to the clamping frame 23. By reason of the fact that the pitch of the threaded portion 38 is equal to one-half of the pitch of the threaded portion 32 of the shaft 31, rocking movement of the yoke levers 34—34 and 41—41 will be equal.

The adjusting mechanism referred to is illustrated in Figures 4, 8 and 9. By inspection of said figures, and particularly Figure 9, it will be noted that disposed within opposite side members 45 of the clamping frame 23 is certain mechanism cooperating with the corresponding short levers 37—37 and 43—43. Referring particularly to Figure 9, embracing the swinging extremity of each of the short levers 37 is a U-shaped member 46, shown in dotted lines. As the parts are viewed in Figure 9, the observer is looking down toward the mouth of said U-shaped member 46. Threaded into the opposite legs of the U-shaped member 46 are bolts 47—47 having studs extending from their heads on the sides opposite to the shanks thereof, said studs being indicated by the numerals 48—48. Said studs are adapted to ride in corresponding apertures in pads 49—49 which are disposed upon the inner sides of the flanges of the corresponding members 45. Sufficient play is provided between the heads of the bolts 47—47 and the adjacent surfaces of the U-shaped member 46 so that said U-shaped member 46 may be disposed within the corresponding channel-shaped frame member 45 and said bolts may be turned to adjust the position of said U-shaped member 46. For the purpose of facilitating the turning of the bolts 47—47, radial holes 50—50 may be provided in the heads of said bolts.

The adjustment provided by the U-shaped members 46—46 and their adjusting bolts 47—47 is important for the reason that it is possible through these instrumentalities to provide a uniform pressure upon the four corners of the clamping frame 23, said uniform pressure being exerted through the unitary source of power, to wit, the sheave 30. This is particularly important due to the fact that there is, unavoidably, a certain amount of torsional deflection in the tubes 35 and 42, which extend throughout the height of the frame structure 12.

The clamping frame 23 communicates its clamping movement to the clamping cylinder 22 through abutment plates 51—51 secured to the inner periphery of said clamping frame 23. Said abutment plates 51—51 are embraced at their two extremities by abutment plates 52—52, which are rigidly secured to the clamping cylinder 22. By reason of this construction, stresses due to the clamping action produced by the clamping mechanism cause no deflection in the clamping cylinder 22. In other words, though the application of clamping pressure to the four corners of the clamping frame 23 may cause certain deflection in said clamping frame, no corresponding deflection is communicated to the clamping cylinder 22, which, if it did occur, would cause leakage at the valve seats.

As shown in Figures 4 and 10, the slide plate valve member 26 is bounded throughout its periphery, except for the bottom edge thereof, with a flange 53, which preferably extends an equal distance from the two sides of said member 26. This flange 53 provides stiffness for the member 26 and particularly adjacent to the periphery of the opening 27, where deflection and leakage would occur if the plate were accidentally distorted.

When the slide plate valve member 26 is being moved it should be out of contact with the seats in the cylinder 14 and the clamping cylinder 22. Retraction of the clamping cylinder 22 is, of course, accomplished by movement of the short levers 37—37 and 43—43 through operation of the sheave 30. In order to move the slide plate valve member 26 away from the seat on the cylinder 12, mechanism is provided which will now be described. Disposed upwardly of the frame structure 12 is a yoke 54, which supports mechanism for operating the slide plate valve member 26. Said yoke 54 includes the two upright members 55—55 secured together at their upper extremities and bolted to the frame structure 12 at their lower extremities. Each of said members 55—55 may take the form of an angle, of which the flange 56 forms a track for a corresponding roller 57. The two rollers 57—57 are coaxially disposed with respect to each other and are carried at the upper extremity of the slide plate valve member 26. As indicated in Figure 3, the bearing surface of the flange 56 is depressed at the region adjacent to the top of the yoke 54 and at the region adjacent to the bottom of said yoke. The depressed portions referred to are indicated by the numerals 58 and 59, respectively, and the intermediate portion of the bearing surface of the flange 56 is indicated by the numeral 60.

Located at the bottom of the frame structure 12 are rollers 61—61 adapted to engage the adjacent edges of the vertical flange 53 on the valve member 26. As indicated in Figure 2, the flange 53 referred to has at its lower extremity a depressed portion, indicated by the numeral 62. Midway of the height of the valve member 26, the corresponding flanges 53-53 are provided with the depressed portion 63. It will be clear that when the valve member 26 is being dropped from its uppermost position, as indicated in Figure 2, to its lowermost position, the rollers 57—57, riding upon the raised portion of the bearing surface of the flanges 56—56 will tend to move the entire valve plate toward the right as the parts are viewed in Figure 2. The rollers 61—61 cooperating with the raised portion 64 of the flange 53 will likewise tend to move the valve member 26 toward the right as the parts are viewed in Figure 3. When the valve member 26 has arrived at its fully lowered position, the recessed portions 63—63 will be disposed against the rollers 61—61, allowing the valve to dispose itself toward the left as the parts are viewed in Figure 3, in seating relationship with the cylinder 14, ready to be clamped by the clamping cylinder 22. It will be understood, of course, that the sidewise motion of the valve member 26 due to the action of the rollers 57—57 and 61—61 will not be sufficient to urge the valve member 26 into contact with the clamping cylinder 22.

By reason of the construction immediately above described, the invention is readily adaptable for use in conduits which are vertically disposed or disposed in an inclined position. It is well understood, of course, that in attempting to move a slide plate valve member across the juncture between portions of a vertically disposed conduit, difficulties will be encountered unless the sliding valve member is out of contact with the valve seats; otherwise scratching and damage of the seats will occur.

It is a feature of the present invention that the slide plate valve member 26 is counterweighted. This is of importance by reason of the fact that it should be possible to operate the slide plate valve member 26 as rapidly as possible to avoid the possibility of leakage of poisonous gas during the operation of moving the member 26 from one of its two operative positions to the other thereof. If gear reduction means were provided to permit the operation of the member 26 by means of the manual efforts of a single operator, the action would be so slow that there might be danger of asphyxiation of the operator. By reason of the counterweighting features embodied in the present invention, a direct balanced drive may be utilized whereby the movement of the valve member 26 may be speedily accomplished. Disposed at the upper extremity of the yoke 54, between the angle members 55—55, is the sprocket 65, which may be mounted in a yoke 66, which may be adjusted vertically by means of the bolt 67. Located at a convenient height is a companion sprocket 68 mounted upon a shaft 69 provided with a hand chain sheave 70, which may be operated by the hand chain 71. A sprocket chain 72 is trained over the sprockets 68 and 65. Said sprocket chain 72 is detachably secured, through any convenient securing means, to the upper extremity of the slide plate valve member 26. Also secured to the sprocket chain 72 is a bracket, indicated by the numeral 73, which has a looped member extending outwardly from said sprocket chain 72. A counterweight 74 is adapted to be mounted upon the looped member 73, and a wedge member 75 is provided for securely fastening said counterweight 74 with respect to the looped member 73. Counterweight plates 76—76 may be provided for varying the effective weight of the counterweight. The counterweight 74 is provided with a pair of screw-eyes 77—77 for convenient handling.

The means for attaching the counterweight to the sprocket chain 72 as above described has a practical advantage in that the counterweight may be readily assembled with or disassembled from the sprocket chain 72. Grab means of a crane may be applied to the screw-eyes 77, whereby after the wedge member 75 has been removed, the counterweight may be readily moved away from the looped bracket 73. In assembling the counterweight 74 upon the sprocket chain 72, the counterweight may be readily handled by the crane and disposed upon the looped bracket 73, after which the wedge member 75 may be applied to hold the counterweight securely in position.

Though a preferred embodiment of the present invention has been described in detail, many modifications will occur to those skilled in the art. It is intended to cover all such modifications that fall within the scope of the appended claims.

What is claimed is:

1. In a valve, in combination, a relatively rigid frame structure adapted to be inserted in a conduit, said frame structure including a conduit portion having a plane valve seat, a slide plate valve member adapted to cooperate with said valve seat to open and close the passageway through said conduit portion, a clamping member adapted to clamp said slide plate valve member against said seat, said clamping member including a conduit portion adapted to exert pressure against said slide plate valve member throughout a continuous area coinciding with the area of said seat, a frame encircling said clamping member for operating said clamping member, said frame having abutting relationship with said clamping member at a plurality of regions spaced symmetrically about said clamping member but disconnected from said clamping member, a plurality of pairs of operating members for said frame, said pairs of operating members being spaced symmetrically with respect to a plane including the axis of said conduit portion, common operating means for said operating members, and adjustment means cooperating with said operating members for controlling the pressure at the various points of application of said operating members upon said frame.

2. In a valve, in combination, a frame structure including a conduit portion, a slide plate valve member adapted to control communication through said conduit portion, a clamping member for clamping said valve member against said first-mentioned conduit portion, and means for exerting pressure upon said clamping member at a plurality of spaced regions disposed symmetrically about the axis of said conduit portion, said means including a plurality of pairs of operating members, and a common shaft for operating said operating members, said shaft being provided with means for moving it longitudinally in response to rotation thereof, one of said pairs of operating members being responsive to longitudinal movement of said shaft, another of said pairs of operating members being responsive to rotative movement of said shaft.

3. In a valve, in combination, a relatively rigid frame structure including a conduit portion, a slide plate valve member controlling communication through said conduit portion, a clamping member including a conduit portion adapted to clamp said valve member against said first-mentioned conduit portion, said clamping member being housed within said frame structure, annular flexing means connecting said clamping member in gas-tight relationship with said frame structure, flexible guard means for preventing access of dust into the region adjacent to said annular flexing means, a frame encircling said clamping member for operating said clamping member, and operating members for said frame, said operating members being spaced symmetrically with respect to a plane including the axis of said conduit, said frame having abutting but non-rigid relationship with said clamping member but by which deflections in said frame will not be communicated to said clamping member.

4. A valve comprising a housing including a conduit portion, a slide plate valve member adapted to control communication through said conduit portion, means for clamping said valve member in seating relationship with said conduit portion, and operating means for said clamping means, said operating means including a plurality of oscillatable members adapted to communicate clamping force to said clamping member at a plurality of points spaced symmetrically about a region encircling the axis of said conduit portion, said means including a plurality of operating means, a common shaft for operating said operating means, said shaft being provided with means for moving it longitudinally in response to rotation thereof, one of said operating means being responsive to longitudinal movement of said shaft, another of said operating means being responsive to rotative movement of said shaft.

5. In a valve, in combination, a frame structure including a conduit portion, a slide plate valve member adapted to be moved transversely with respect to said conduit portion, a clamping member for clamping said valve member with respect to said conduit portion, and frame means encircling the projected cross-sectional area of said conduit portion for operating said clamping member, operating members operable in unison for moving said frame means longitudinally of said conduit portion, and adjusting means for controlling the pressure upon said frame means by said operating members, said frame means having abutting relationship with said clamping member but having no rigid connection therewith whereby deflections in said frame will not be communicated to said clamping member.

6. In a valve, in combination, a frame structure including a conduit portion, a slide plate valve member adapted to be moved transversely with respect to said conduit portion, clamping means for clamping said valve member with respect to said conduit portion, frame means for operating said clamping member, said frame means having abutting relationship with said clamping member but having no rigid connection therewith, and a plurality of oscillatable members movable in unison for applying pressure to said frame means at spaced regions disposed symmetrically with respect to the axis of said conduit portion.

7. In a valve, in combination, a frame structure including a conduit portion, a slide plate valve member adapted to be moved transversely with respect to said conduit portion, clamping means for clamping said valve member with respect to said conduit portion, frame means for operating said clamping means, said frame means having abutting relationship with said clamping means but having no rigid connection therewith, and a plurality of oscillatable members for applying pressure to said frame means at spaced regions disposed symmetrically with respect to the axis of said conduit portion, said oscillatable members being connected together in pairs, said frame means being provided with adjustment means for controlling the actions of the respective oscillatable members upon said frame means.

8. In a valve, in combination, a frame structure including a conduit portion, a slide plate valve member adapted to be moved transversely with respect to said conduit portion, clamping means for clamping said valve member with respect to said conduit portion, frame means for operating said clamping member, said frame means having abutting relationship with said clamping member but having no rigid connection therewith, a plurality of oscillatable members for applying pressure to said frame means at spaced regions disposed symmetrically with respect to the axis of said conduit portion, said oscillatable members being connected together in pairs, said frame means being provided with adjustment means for controlling the actions of the respective oscillatable members upon said frame means, and a common operating shaft for communicating rocking movement to said oscillatable members.

9. In combination, a valve including a valve seat, a slide plate valve member, means for clamping said valve member in position upon said seat, levers for applying clamping force to said valve member at a plurality of regions symmetrically spaced relative to said seat, pairs of said levers being connected together, adjustment means cooperatively associated with said levers for controlling the action of said levers upon said clamping means, a rotatable shaft, a nut disposed upon said shaft held against rotation whereby turning of said shaft will move said nut longitudinally, means connecting said nut with certain of said levers to communicate rocking movement to said certain levers, a second nut cooperating with said shaft whereby turning movement of said shaft will cause longitudinal movement thereof, and means responsive to longitudinal movement of said shaft to cause rocking movement of the others of said levers.

10. In combination, a valve including a valve seat, a slide plate valve member, means for clamping said valve member in position upon said seat, levers for applying clamping force to said valve member at a plurality of regions symmetrically spaced relative to said seat, pairs of said levers being connected together, adjustment means cooperatively associated with said levers for controlling the action of said levers upon said clamping means, a rotatable shaft, a nut disposed upon said shaft held against rotation whereby turning of said shaft will move said nut longitudinally, means connecting said nut with certain of said levers to communicate rocking movement to said certain levers, means for causing said shaft to move longitudinally in response to rotation of said shaft, and means responsive to longitudinal movement of said shaft for communicating rocking movement to others of said levers.

11. In a valve, in combination, a conduit portion having a plane valve seat, a slide plate valve member adapted to cooperate with said valve seat to open and close the passageway through said conduit portion, a clamping member adapted to clamp said slide plate member against said seat, said clamping member including a conduit portion adapted to exert pressure against said slide plate valve member throughout a continuous area corresponding with the area of said seat, a frame encircling said clamping member for operating said clamping member, operating members for said frame, said operating members being spaced symmetrically with respect to a plane including the axis of said conduit, said frame having abutting but non-rigid relationship with said clamping member whereby deflections in said frame will not be communicated to said clamping member.

12. In a valve, in combination, a conduit portion having a plane valve seat, a slide plate valve member adapted to cooperate with said valve seat to open and close the passageway through said conduit portion, a clamping member adapted to clamp said slide plate member against said seat, said clamping member including a conduit portion adapted to exert pressure against said slide plate valve member throughout a continuous area corresponding with the area of said seat, a frame encircling said clamping member for operating said clamping member, operating members for said frame, said operating members being spaced symmetrically with respect to a plane including the axis of said conduit, said frame having abutting but non-rigid relationship with said clamping member whereby deflections in said frame will not be communicated to said clamping member, a rotatable shaft for communicating movement to said operating members in unison, said shaft having a threaded portion, a relatively stationary nut engaging said threaded portion to cause said shaft to move longitudinally when rotated, certain of said operating members being connected to said shaft to move when said shaft moves longitudinally, said shaft having a second threaded portion, a nut engaging said second threaded portion to move longitudinally when said shaft is rotated, certain of said operating members being connected to said nut to move when said nut moves longitudinally.

13. In a valve, in combination, a conduit portion having a plane valve seat, a slide plate valve member adapted to cooperate with said valve seat to open and close the passageway through said conduit portion, a clamping member adapted to clamp said slide plate member against said seat, said clamping member including a conduit portion adapted to exert pressure against said slide plate valve member throughout a continuous area corresponding with the area of said seat, a frame encircling said clamping member for operating said clamping member, operating members for said frame, said operating members being spaced symmetrically with respect to a plane including the axis of said conduit, said frame having abutting but non-rigid relationship with said clamping member whereby deflections in said frame will not be communicated to said clamping member, a rotatable shaft for communicating movement to said operating members in unison, said shaft having a threaded portion, a relatively stationary nut engaging said threaded portion to cause said shaft to move longitudinally when rotated, certain of said operating members being connected to said shaft to move when said shaft moves longitudinally, said shaft having a second threaded portion, a nut engaging said second threaded portion to move longitudinally when said shaft is rotated, certain of said operating members being connected to said nut to move when said nut moves longitudinally, one of said threaded portions having half the pitch of the other of said threaded portions.

ARTHUR J. BOYNTON.
CARL J. WESTLING.